Patented Oct. 14, 1924.

1,511,721

UNITED STATES PATENT OFFICE.

WILLIAM N. DAVIS, OF OAKLAND, AND GEORGE A. DAVIDSON, OF BERKELEY, CALIFORNIA, ASSIGNORS TO STANDARD OIL COMPANY, OF SAN FRANCISCO, CALIFORNIA, A CORPORATION OF CALIFORNIA.

TREATMENT OF ACID SLUDGE.

No Drawing.    Application filed June 19, 1922.    Serial No. 569,551.

*To all whom it may concern:*

Be it known that we, WILLIAM N. DAVIS and GEORGE A. DAVIDSON, citizens of the United States, and residing at the cities of Oakland and Berkeley, respectively, county of Alameda, and State of California, have invented new and useful Improvements in the Treatment of Acid Sludge, of which the following is a specification.

Our invention relates to the process of treating acid sludge, obtained by the action of sulphuric acid on petroleum oils or distillates, for recovering from said acid sludge the sulphuric acid and a combustible tar.

Petroleum oils or distillates all contain more or less of those constituents known as unsaturated and aromatic compounds. These materials are commonly removed, either partly or entirely in the refining of petroleum oils for different purposes. In such refining processes, petroleum oils are treated with sulphuric acid, and the unsaturated and aromatic material combines with the sulphuric acid producing compounds which are precipitated from the treated oil in the form of a tarry sludge. The sludge contains not only the products of reaction but includes a certain amount of uncombined acid.

The nature of the acid sludge obtained by such treatment of petroleum oils varies very greatly. The factors which govern the nature of such sludge are the gravity of the petroleum oil or distillate treated, the nature of the unsaturated and aromatic material present, the strength of the acid used in treatment and the physical conditions under which the treatment is conducted, such as temperature, means of agitation, proportions of oil and acid, etc. It naturally follows that the difficulties encountered in the treatment of these acid sludges and the products obtained thereby, depend largely on the nature of the sludge which is treated.

Two classes of compounds contained in petroleum or petroleum distillates are attacked by sulphuric acid, one the unsaturated hydrocarbons and the other the aromatic hydrocarbons. The action of sulphuric acid on these different series produces acid sludges which are quite different, having different properties and requiring different methods of treatment. What material will be removed from the petroleum oil or distillate depends greatly on the strength of the acid used in the treatment.

We are aware there have been proposed a number of recovery processes for treatment of acid sludge but such processes are limited in their application only to the more easily treated sludges. These processes are unsuited either to the treatment of sludge obtained from the heavier oils or to the treatment of sludges obtained by the action of very concentrated or fuming acids on certain petroleum oils or distillates, or they require such quantities of heat and special apparatus, etc., as to make them totally unsuitable for commercial application.

It is not sufficient in the treatment of acid sludge that most of the tarry matter should be separated from the acid. It is necessary to produce an acid practically free from tarry matter or dissolved sulphonic acids. Otherwise, such produced acid cannot be properly concentrated for use due to the excessive foaming, carbonization and separation of tar in the concentrating process. The acid sludges obtained at a refinery not only represent a large loss of valuable constituents such as sulphuric acid and tar, but these acid sludges are a great nuisance around the refinery and difficult to dispose of. Our invention provides a commercial process for treating these acid sludges and especially for treating such acid sludges as have been obtained from the action of concentrated or fuming acids on lamp oil stocks.

An important object of our invention is to recover an acid from acid sludge which can be readily concentrated without excessive foaming, coke formation, separation of tar, etc.

An important object of our invention is to produce a fairly strong acid which does not require excessive concentration, An important feature of our invention is the utilization of the heat of reaction for maintaining the required treating temperature.

An important object of our invention is to provide a process whereby an acid sludge resulting from treatment of petroleum containing unsaturated and aromatic compounds with sulfuric acid can be treated to obtain an easily concentrated sulfuric acid and a combustible tar.

Another object of our invention is to provide a process whereby sulfuric acid may be recovered economically from acid sludges which cannot be economically treated by any hitherto developed process.

The following is an illustration of a process embodying the features of our invention.

The acid sludge is mixed in an insulated retort with the proper amount of water and brought to a temperature between 330 and 375° F. by injection of steam. The amount of water and steam so added are sufficient to dilute the sulfuric acid produced by the process to a specific gravity of not more than 1.526 (50° Baumé.)

The steam is preferably injected through a perforated pipe near the bottom of the retort. When the temperature reaches the required point the steam is shut off and the treatment proceeds under the heat of reaction between the water and the acid sludge. The pressure in the retort is held preferably between 80 and 110 pounds gauge per square inch (although pressures as low as fifty pounds per square inch may be utilized in some cases) and will reach its maximum in from 10 to 25 minutes after injection of the steam. The retort is so insulated as to retain the required hydrolyzing heat for a period of from 2½ to 4 hours. At the end of this time, the reaction has proceeded to such an extent, that the separated acid is practically free from organic matter, and adapted thereafter to be easily concentrated without excessive foaming, separation of tar, etc.

The tar separates on the top of the acid and is practically free from acid. The acid and tar are drawn separately from the retort, the acid being in a suitable condition for concentration and the tar available either as fuel or as a source of valuable products such as aromatic oils, solvents, etc. It is very important for treating certain acid sludges that a high degree of heat be maintained for a considerable period of time. A vital step in our process when treating acid sludge of extremely difficult or stubborn nature is the maintaining of this necessary hydrolyzing heat. The expense of maintaining this high heat is eliminated and process made commercially adaptable by the utilization of the heat of reaction.

It is understood that the preceding description is only an illustration of a practical application of our invention. Our invention is not limited in any way to the preceding description but is of the scope embodied in the following claims.

We claim—

1. A process of hydrolyzing acid sludge obtained from the treatment of petroleum which consists in mixing said acid sludge with water, injecting just sufficient steam to raise the mass to the high hydrolyzing temperature, and completing the hydrolysis and separation of sludge into acid and tar under a pressure of over 50 pounds gage, by maintaining the mass in an insulated retort wherein the heat of reaction and the application of the requisite pressure maintain the necessary hydrolyzing temperature.

2. A process of hydrolyzing acid sludge obtained from the treatment of petroleum which consists in mixing said acid sludge with water, injecting just sufficient steam to raise the mass to a temperature between 330 and 375° F. and completing the hydrolysis and separation of sludge into acid and tar under a pressure of over 50 pounds gage, maintaining the mass in an insulated retort wherein the heat of reaction and the application of the requisite pressure maintain the necessary hydrolyzing temperature.

3. A process of hydrolyzing acid sludge obtained from the treatment of petroleum which consists in mixing said acid sludge with water, injecting just sufficient steam to raise the mass to a temperature between 330 and 375° F., the amount of water and steam added being sufficient to produce thereafter an acid having a specific gravity not greater than 50° Baumé and completing the hydrolysis and separation of sludge into acid and tar under a pressure of over 50 pounds gage, by maintaining the mass in an insulated retort wherein the heat of reaction and the application of the requisite pressure maintain the necessary hydrolyzing temperature.

A process of hydrolyzing an acid sludge in which a body of acid sludge and water is maintained in a closed insulated retort under an evolved pressure greater than 50 pounds per square inch and at a hydrolyzing temperature corresponding to such pressure, the hydrolyzing temperatures being maintained solely through the resultant heat of reaction.

Signed at Richmond, California, this 10th day of June, 1922.

WILLIAM N. DAVIS.
GEORGE A. DAVIDSON.